United States Patent [19]

Leonowich

[11] Patent Number: 5,285,477
[45] Date of Patent: Feb. 8, 1994

[54] BALANCED LINE DRIVER FOR LOCAL AREA NETWORKS OR THE LIKE

[75] Inventor: Robert H. Leonowich, Muhlenberg Township, Berks County, Pa.

[73] Assignee: AT&T Bell Laboratories, Murray Hill, N.J.

[21] Appl. No.: 810,632

[22] Filed: Dec. 18, 1991

[51] Int. Cl.⁵ .............................................. H04B 3/00
[52] U.S. Cl. ...................................... 375/36; 307/270
[58] Field of Search ..................... 375/36, 27; 307/270, 307/355, 446, 448; 361/159; 370/85.1

[56] References Cited

U.S. PATENT DOCUMENTS

| | | | |
|---|---|---|---|
| 4,121,118 | 10/1978 | Miyazaki | 375/36 |
| 4,337,465 | 6/1982 | Spracklen et al. | 375/36 |
| 4,445,222 | 4/1984 | Smitt | 375/36 |
| 4,615,039 | 9/1986 | Li et al. | 375/36 |
| 5,012,384 | 4/1991 | Chew | 361/159 |
| 5,077,756 | 12/1991 | Christophersen | 375/36 |

OTHER PUBLICATIONS

"International Standard", ISO 8802-3 ANSI/IEEE Std. 802.3, First Edition 1989-02-24, pp. 92-99.
"A CMOS Ethernet Serial Interface Chip", Digest of Technical Papers, ISSCC 84/Thursday, Feb. 23, 1984/Imperial Ballroom/ THAM 13.1 pp. 184 and 185.
"10 MB/S Twisted Pair CMOs Transceiver with Transmit Waveform Pre-Equalization" IEEE 1991 Custom Integrated Circuits Conference, Cheng-chung Shih, Joe Heideman, Haim Shafir, Stefan Wurster, pp. 7.3.1 to 7.3.4.

Primary Examiner—Curtis Kuntz
Assistant Examiner—T. Ghebretinsae
Attorney, Agent, or Firm—Scott W. McLellan

[57] ABSTRACT

A differential line driver with small common mode shift when going inactive. Two pairs of serially coupled switches diagonally switch when sending data. All switches close when the driver is disabled, the common mode output voltage being established by resistors serially disposed between the pairs of switches and the power source therefore.

4 Claims, 2 Drawing Sheets

BALANCED LINE DRIVER FOR LOCAL AREA NETWORKS OR THE LIKE

BACKGROUND OF THE INVENTION

1. Cross-Reference to Related Application

This application is related to a co-pending patent application titled "Differential Comparator With Differential Threshold for Local Area Networks or the Like", by F. J. Fernandez and R. H. Leonowich, Ser. No. 07/810,272, filed simultaneously with, and assigned to the same assignee, as this application.

2. Field of the Invention

Invention relates to line drivers in general and, more particularly, to integrated circuit balanced (differential) line drivers.

3. Description of the Prior Art

Many hard-wired digital communication systems use a twisted pair wires as the communication medium between nodes on a network. For example, CSMA/CD local area network systems (Carrier Sense Multiple Access with Carrier Detect, part of the IEEE 802.3 standard) may use the Attachment Unit Interface standard (using shielded wire pairs) to communicate between users on the network and a coaxial cable backbone. Similarly, 10BASE-T local area networks use unshielded wire pairs for communication between users.

Transmission on a wire pair is usually differential in nature to maximize the signal-to-noise ratio at the far end of the pair. What shape the signals "look like" when transmitted is usually contained by a template which is part of a standard. Using the above example for the Attachment Unit Interface (AUI) standard (part of the IEEE 802.3 standard), a pulse template, pulse diagram, test load, and other voltage limitations/specifications are furnished by a standards body. This information sets the performance limitations on a transmitted pulse. Because the test load is reactive and resistive, significant pulse over/undershoot and ringing can occur. The over/undershoot and ringing are usually considered undersirable and the standard places limits on them.

A widely used prior-art driver for AUI systems is shown in FIG. 3. The driver 30 provides a differential signal to test load 20 (as defined by the standard) through DC-blocking capacitors 18. The driver 30 has a pair of complementary driven conventional CMOS inverters 31, 32 (using exemplary inverter 33) powered between the power supply $V_{CC}$ and ground. In this instance, however, the power supply return for the drivers 31, 32 is through a variable current source 34 to ground. During data transmission, the inverters 31, 32 are complementary switched to produce the differential signal to load 20. Current source 34 provides more than enough current for inverters 31, 32 to drive the load 20. When the driver 30 is placed in the idle state, current source 34 is throttled back, reducing current flow through load 20. This is required because the AUI standard limits the amount of ringing that can occur when the driver 30 goes from active to idle with the inductive test load 20.

A byproduct of this driver design is a common mode shift that occurs when driver 30 goes idle. The common mode shift (DC) is coupled by capacitors 18 to the load 20 as a pulse. This pulse may exceed that allowed by the standard. Thus, an isolation transformer (not shown), disposed between capacitors 18 and load 20, may be required to meet the common mode shift limitations. Unfortunately transformers have inter-winding capacitance which may defeat the purpose of the transformer, requiring more elaborate compensation techniques (e.g., shunt capacitors to ground which may unacceptably lengthen the data pulse rise/fall times when the driver 30 is active).

Thus, it is desirable to provide a differential driver with less ringing and common mode shift difficulties than prior art drivers. Further, it is desirable to provide such a driver that more closely meets system standards without requiring costly, and potentially unreliable, transformers or other compensation techniques.

SUMMARY OF THE INVENTION

A differential line driver having two outputs, characterized by first and second pairs of serially coupled switches and first and second resistors. Each of the first and second pairs of serially coupled switches have first and second outputs, a common output, and two corresponding inputs, the common outputs of each coupling to the two outputs of the driver. The first resistor has two terminals, one terminal coupling to a first power source and the other terminal coupling to the first outputs of the pairs of switches. The second resistor has two terminals, one terminal coupling to a second power source and the other terminal coupling to the second outputs of the pairs of switches.

The arrangement of the switches allows for differential transmission of data when the driver is enabled. When disabled, the switches are all closed, coupling the outputs of the driver together with small common mode shift.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
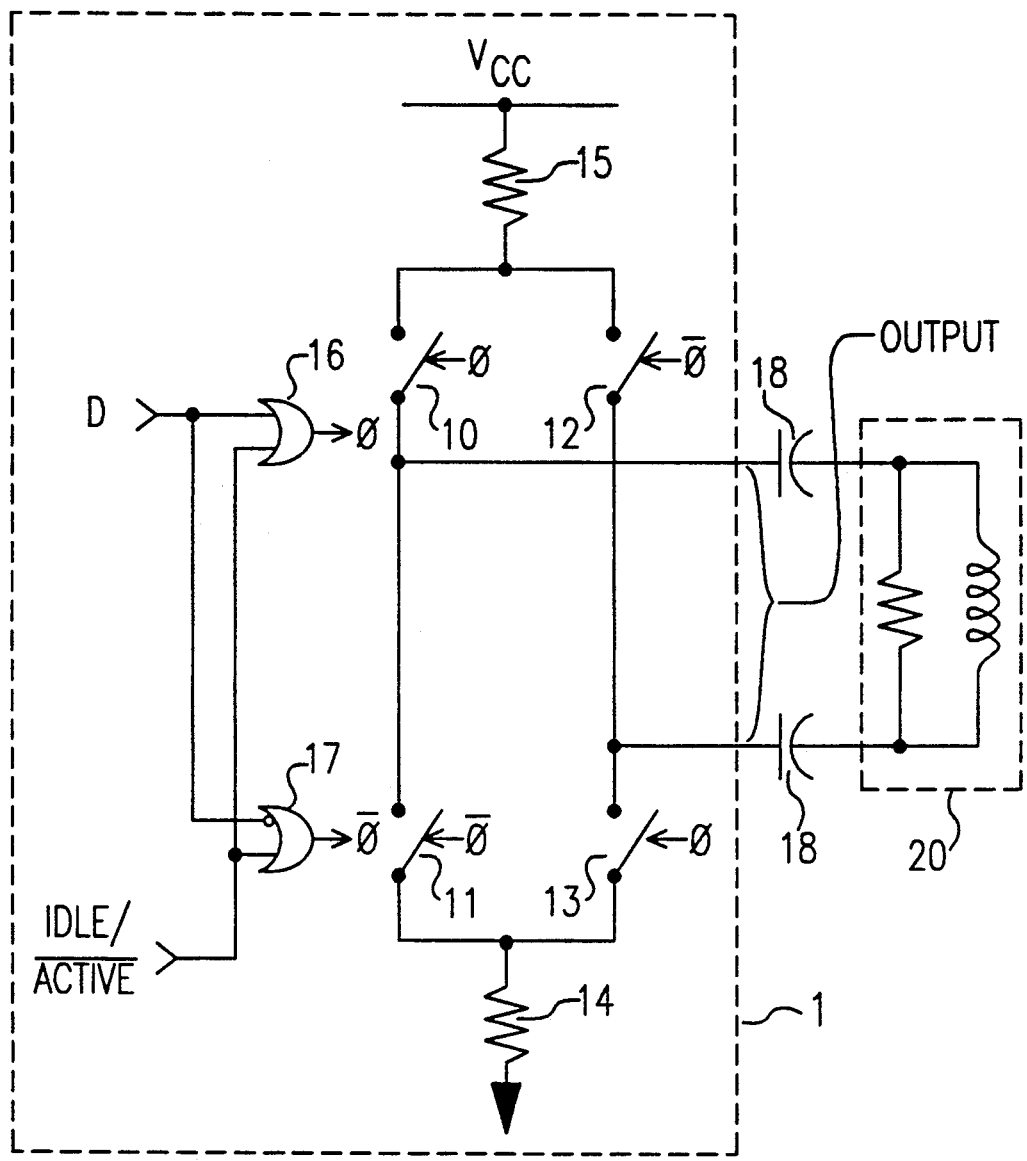
FIG. 1 is a simplified schematic diagram of a differential line driver as one embodiment of the invention.

An exemplary embodiment of the invention is shown in FIG. 1. Here, switches 10, 11 and 12, 13 each make a pair of serially coupled switched with a common output coupled to the output of a differential driver 1. The pairs of switches 10, 11 and 12, 13 have outputs connected together and to corresponding resistors 14, 15. The resistor 15 couples to a first power source ($V_{CC}$) and resistor 14 couples to a second power source (ground). It is understood that the second power source may be another voltage other than ground (zero volts). Resistors 14, 15 may be on-chip or off-chip depending on the application and power dissipation considerations.

As shown, the input to switches 10 and 13 are the same ($\phi$) as well as for switches 11 and 12 ($\bar{\phi}$). This allows for the switches to be switched diagonally to send data differentially to load 20 through DC blocking capacitors 18. Differential switching involves switches 10, 13 open and close together while switches 11, 12 open and close together in complement to switches 10, 13. When driver 1 is disabled (idle), it is desirable to close all the switches 10, 11, 12, 13, thus coupling the outputs together without significant common mode shift.

Control of switches 10, 11, 12 and 13 is accomplished by exemplary means of gates 16 and 17. When the IDLE/ACTIVE input (enable) signal is "low", (active), signals on input D passes through gate 16 to control switches 10, 13 while the signals on input D are inverted by gate 17 to control switches 11, 12. Thus, when the driver is active, the switches 10-13 are diagonally switched, sending data on input D differentially. If, however, the IDLE/ACTIVE input is "high" (idle), then both outputs from gates 16, 17 are "high", causing switches 10-13 to be closed, as described above.

Figure 2:
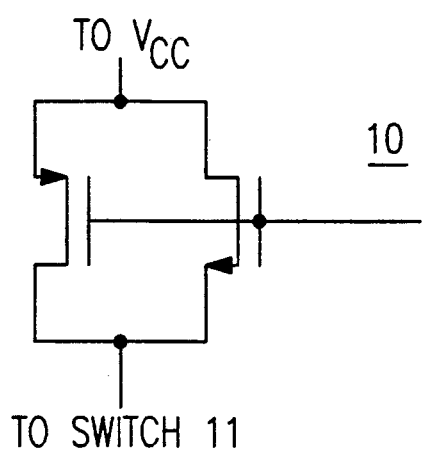
FIG. 2 is a simplified schematic diagram of switch used in the driver of FIG. 1; and, FIG. 3 is a simplified schematic diagram of a prior art differential line driver.

An exemplary switch 10 is shown in FIG. 2. As shown, switch 10 (as well as switches 11-13) is a CMOS transmission gate with transistors suitably sized to handle the current necessary to drive load 20 (FIG. 1) or any other predetermined load. It is noted that, depending on the application, single transistors may be used as a switch.

Figure 3:
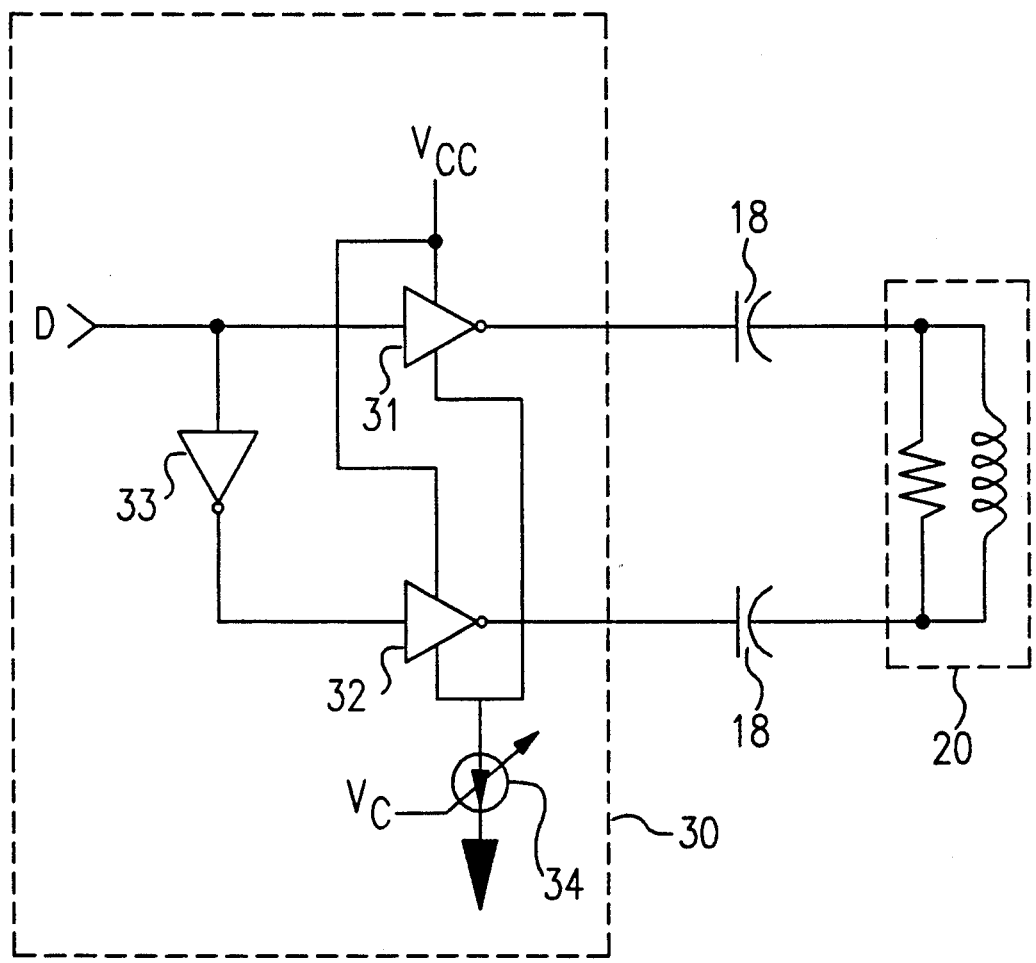

An integrated circuit version of the driver 1 (FIG. 1) has been fabricated for application driving an AUI network. Resistance values for resistors 14, 15 are approximately 90 ohms. Such a driver 1, without a transformer, more closely met the 802.3 standards for AUI transmission than the prior art driver of FIG. 3 with or without the transformer 19.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

I claim:

1. A differential line driver having two outputs, CHARACTERIZED BY:
   a first pair of serially coupled switches having first, second and common outputs and two inputs controlling corresponding switches, the common output coupling to a first one of the two driver outputs;
   a second pair of serially coupled switches having a first, second and common outputs and two inputs for controlling corresponding switches, the common output coupling to a second one of the two driver outputs;
   a first resistor with two terminals, one terminal coupling to a first power source and the other terminal coupling to the first outputs of each of the pairs of switches;
   a second resistor with two terminals, one terminal coupling to a second power source and the other terminal coupling to the second outputs of each of the pairs of switches; and,
   control means having a data input and an enable input and coupling to the inputs of the switches, for switching the switches in response to the data input when the enable is active and closing all switches when enable signal is inactive.

2. The differential line driver as recited in claim 1, wherein the inputs to the first and second pairs of switches are coupled together such that the switches may be diagonally switched.

3. The differential line driver as recited in claim 2, wherein the resistors have substantially the same value.

4. The differential line driver as recited in claim 3, wherein the switches are transmission gates.

* * * * *